United States Patent
Ihm et al.

(10) Patent No.: US 7,912,425 B2
(45) Date of Patent: Mar. 22, 2011

(54) METHOD OF TRANSMITTING AND RECEIVING INFORMATION OF ALLOCATING UPLINK REGION IN BROADBAND WIRELESS ACCESS

(75) Inventors: Bin Chul Ihm, Anyang-si (KR); Ki Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 11/910,441

(22) PCT Filed: Mar. 30, 2006

(86) PCT No.: PCT/KR2006/001160
§ 371 (c)(1),
(2), (4) Date: Jul. 23, 2008

(87) PCT Pub. No.: WO2006/104353
PCT Pub. Date: Oct. 5, 2006

(65) Prior Publication Data
US 2008/0298315 A1  Dec. 4, 2008

(30) Foreign Application Priority Data

Mar. 30, 2005 (KR) .................. 10-2005-0026795
Apr. 28, 2005 (KR) .................. 10-2005-0035404
Jun. 13, 2005 (KR) .................. 10-2005-0050367
Jun. 14, 2005 (KR) .................. 10-2005-0051039
Jul. 7, 2005 (KR) .................. 10-2005-0061432

(51) Int. Cl.
*H04B 1/00* (2006.01)
*H04B 7/00* (2006.01)
*H04B 15/00* (2006.01)

(52) U.S. Cl. ........... 455/39; 455/70; 455/502; 455/507; 370/328; 370/350

(58) Field of Classification Search .................. 370/324, 370/328–331, 335–336, 341–343; 455/39, 455/70, 436, 500–502, 517, 509, 450–452.1, 455/507
See application file for complete search history.

(56) References Cited

U.S. PATENT DOCUMENTS

| | | | |
|---|---|---|---|
| 7,307,973 B2 * | 12/2007 | Song et al. | 370/331 |
| 2005/0030931 A1 * | 2/2005 | Sung et al. | 370/342 |
| 2005/0041573 A1 * | 2/2005 | Eom et al. | 370/208 |
| 2005/0058058 A1 * | 3/2005 | Cho et al. | 370/208 |

FOREIGN PATENT DOCUMENTS

| | | |
|---|---|---|
| KR | 1020030084243 A | 11/2003 |
| KR | 1020050014315 A | 2/2005 |
| KR | 1020050015119 A | 2/2005 |
| KR | 1020060097508 A | 9/2006 |

OTHER PUBLICATIONS

Dong-Hoon C. et al., "Performance Analysis of the IEEE 802.16 Wireless Metropolitian Area Network".

* cited by examiner

*Primary Examiner* — Simon D Nguyen
(74) *Attorney, Agent, or Firm* — Lee, Hong, Degerman, Kang & Waimey (57) ABSTRACT

A method of receiving the uplink region allocation information is disclosed. In a broadband wireless access system, in which a mobile terminal receives uplink region allocation information, the present invention includes the steps of receiving an uplink map message from which an uplink map information element (UL-MAP IE) for a ranging region or an uplink bandwidth request region is omitted from a base station and receiving information for a region for a ranging region or uplink bandwidth request using a message periodically transmitted for a control information transmission for an uplink channel. By transmitting uplink region allocation information via a periodically transmitted message, the uplink region allocation information can be efficiently transmitted.

14 Claims, 7 Drawing Sheets

METHOD OF TRANSMITTING AND RECEIVING INFORMATION OF ALLOCATING UPLINK REGION IN BROADBAND WIRELESS ACCESS

CROSS-REFERENCE TO RELATED APPLICATIONS

This application is a 371 U.S. national stage application of International Application No. PCT/KR2006/001160, filed on Mar. 30, 2006, which claims priority to Korean Application Nos. 10-2005-0061432, filed on Jul. 7, 2005, 10-2005-0051039, filed on Jun. 14, 2005, 10-2005-0050367, filed on Jun. 13, 2005, 10-2005-0035404, filed on Apr. 28, 2005, and 10-2005-0026795 filed on Mar. 30, 2005, the contents of which are incorporated by reference herein in their entirety.

TECHNICAL FIELD

The present invention relates to a wireless communication system, and more particularly, to a method of transmitting and receiving control information applied to a wireless communication system.

BACKGROUND ART

Figure 1:
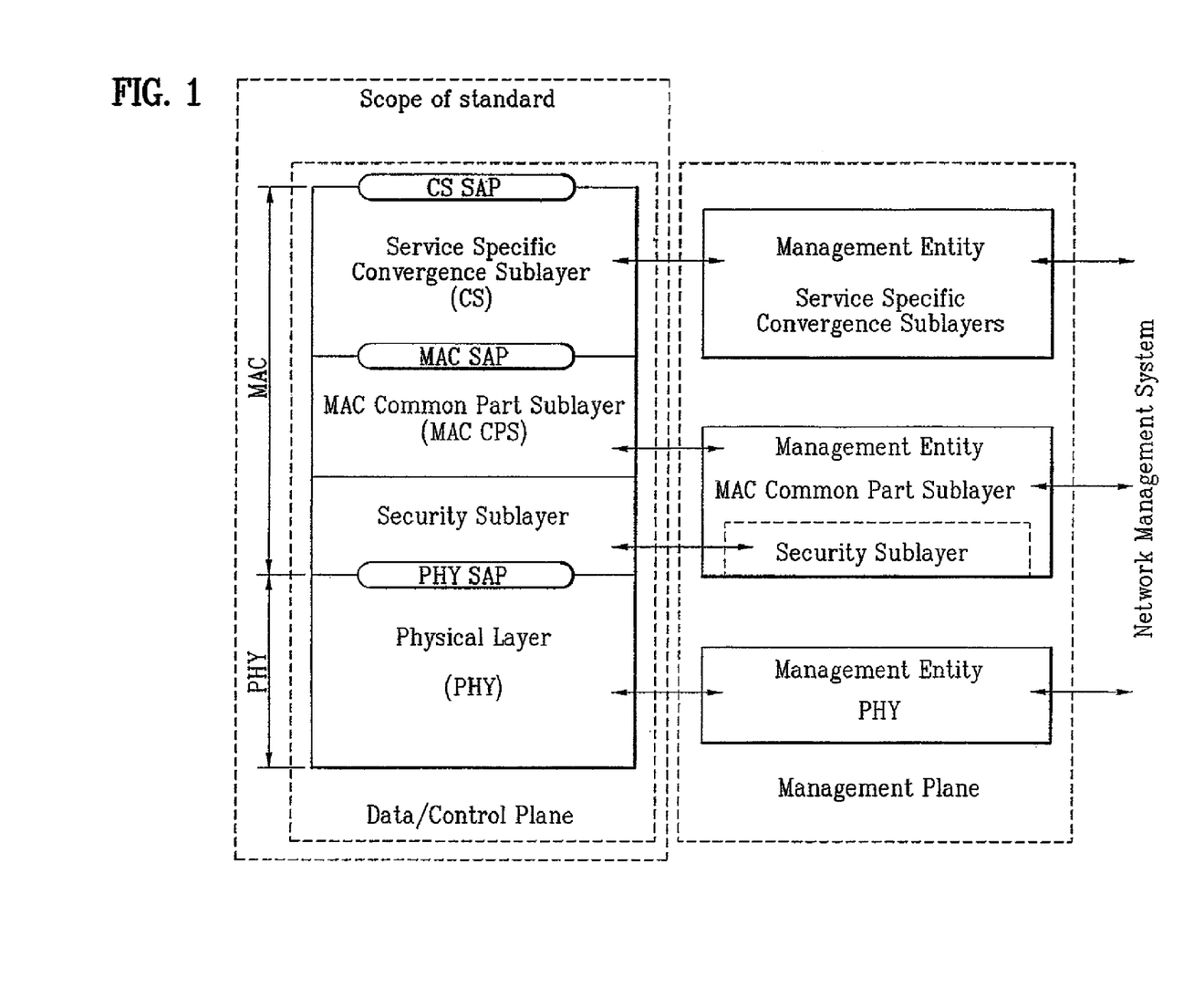
FIG. 1 is a structural diagram of a protocol layer of a broadband wireless access system.

FIG. 1 is a structural diagram of a protocol layer of a broadband wireless access system. A broadband wireless access system defines a protocol of a medium access control (hereinafter abbreviated 'MAC') and a physical (hereinafter abbreviated 'PHY') layer for a point-to-multipoint connection between a base station and a mobile terminal. In the present specification, a mobile terminal includes a mobile subscriber station (MSS) capable of performing a handover between at least one or more base stations and a subscriber station (SS) capable of wireless communications within one access point (AP) or a base station.

A highest port of a MAC layer, which is a service specific convergence sublayer, transforms packet data of various upper core networks into a common protocol data unit (hereinafter abbreviated PDU) according to MAC specifications and compresses a header of a corresponding packet.

Figure 2:
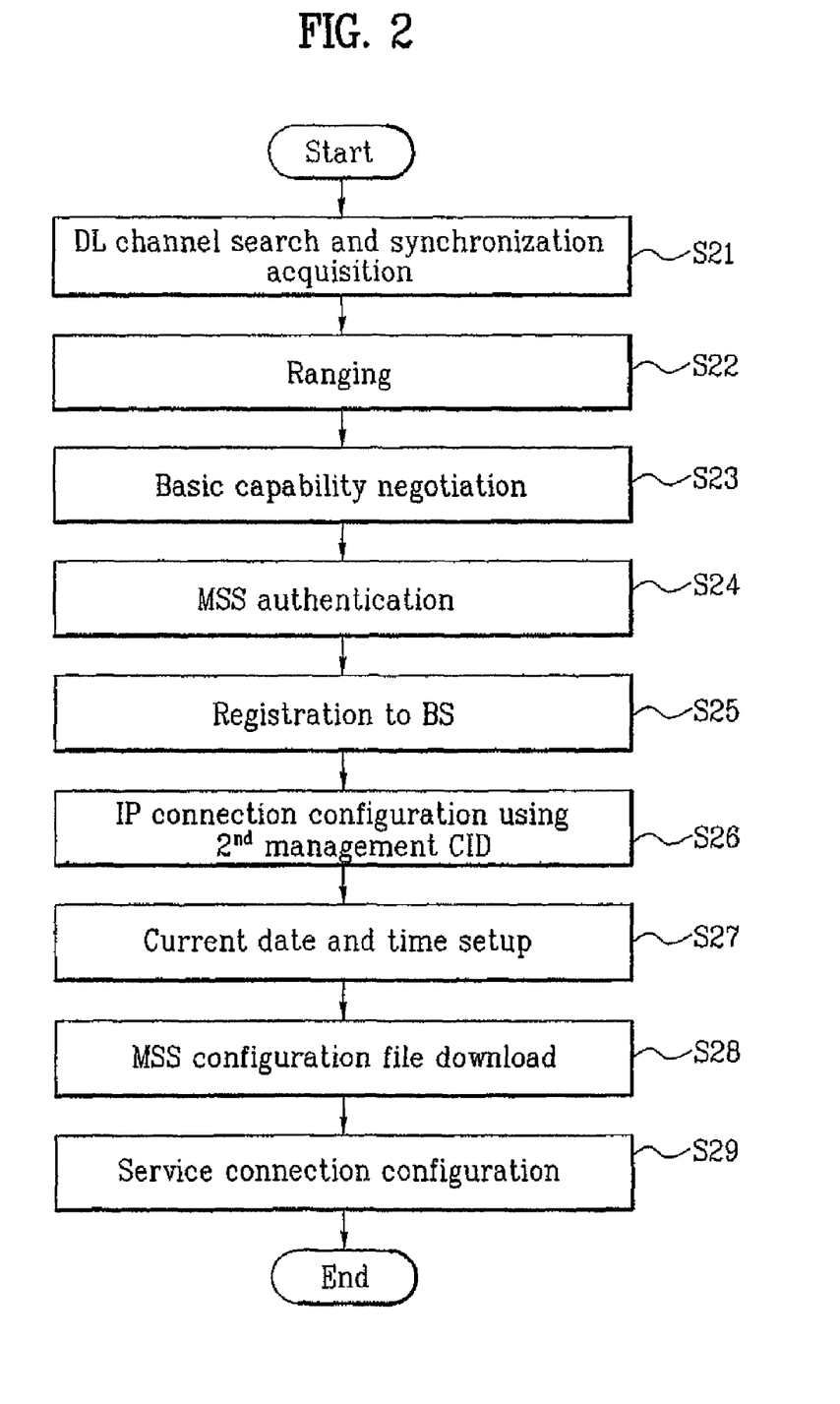
FIG. 2 is a flowchart of an initialization procedure of a mobile terminal in a broadband wireless access system.

FIG. 2 is a flowchart of an initialization procedure of a mobile terminal in a broadband wireless access system. Referring to FIG. 2, if a power of a mobile terminal is turned on, the mobile terminal searches a downlink channel, acquires uplink/downlink synchronization with a base station and receives a downlink MAP (DL-MAP) message, an uplink MAP (UL-MAP) message, a downlink channel descriptor (hereinafter abbreviated 'DCD') message and an uplink channel descriptor (hereinafter abbreviated 'UCD') message from a base station to acquire uplink/downlink channel parameter (S21).

The mobile terminal adjusts an uplink transport parameter by performing ranging with the base station and a basic management CID and a primary management CID are allocated to the mobile terminal by the base station (S22). And, the mobile terminal performs a negotiation with the base station for base station (S23). Moreover, authentication for the mobile terminal is carried out (S24). And, a secondary management CID is allocated by the base station to the mobile terminal managed with IP through a registration to the base station (S25). An IP connection is configured (S26). A current date and time are set (S27). And, a connection for a previously prepared service is configured by downloading a configuration file of the mobile terminal from a TFTP server (S29).

In the course of performing the initial network registration process, as shown in FIG. 2, a procedure that the mobile terminal adjusts transport parameters (frequency offset, time offset, transmit power) for an uplink communication with the base station is called a ranging. After completion of the network registration process, the mobile terminal periodically performs the ranging to keep maintaining the uplink communication with the base station continuously.

A physical layer of a broadband wireless access system transmits a signal according to a single carrier or multi-carrier system. As an example of the multi-carrier system, orthogonal frequency division multiplexing (hereinafter abbreviated 'OFDM) can be used. Meanwhile, as an access system for allocating a resource by a subchannel unit generated from grouping portions of carriers, orthogonal frequency division multiple access (hereinafter abbreviated 'OFDMA') can be used.

Figure 3:
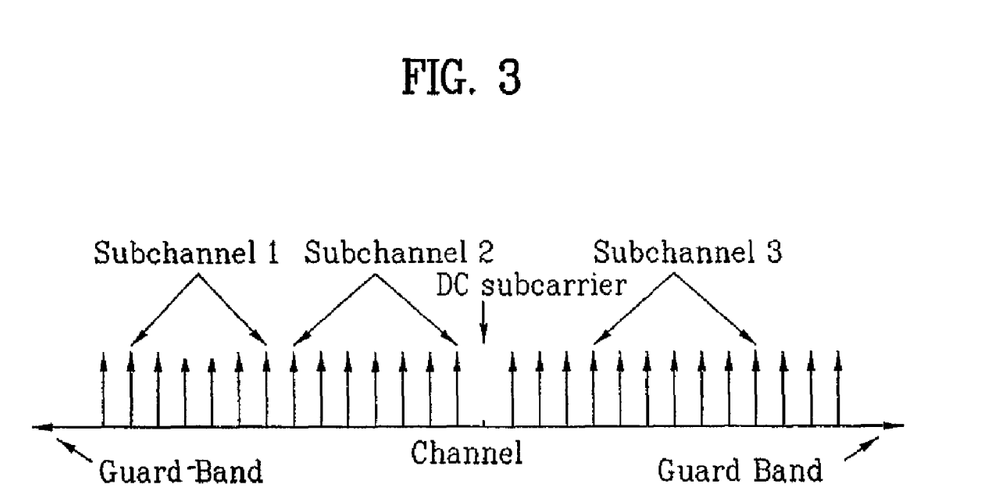
FIG. 3 is a diagram of a subchannel in an OFDMA physical layer.

FIG. 3 is a diagram of a subchannel of an OFDMA physical layer. In the example shown in FIG. 3, there are three subchannels each of which is constructed with two subcarriers. In this case, carriers configuring the subchannels may exist adjacent to each other or can be equally spaced apart from each other. Thus, in case that a multiple access is enabled by the subchannel unit, frequency diversity gain, gain according to power concentration and forward power control can be efficiently performed.

Figure 4:
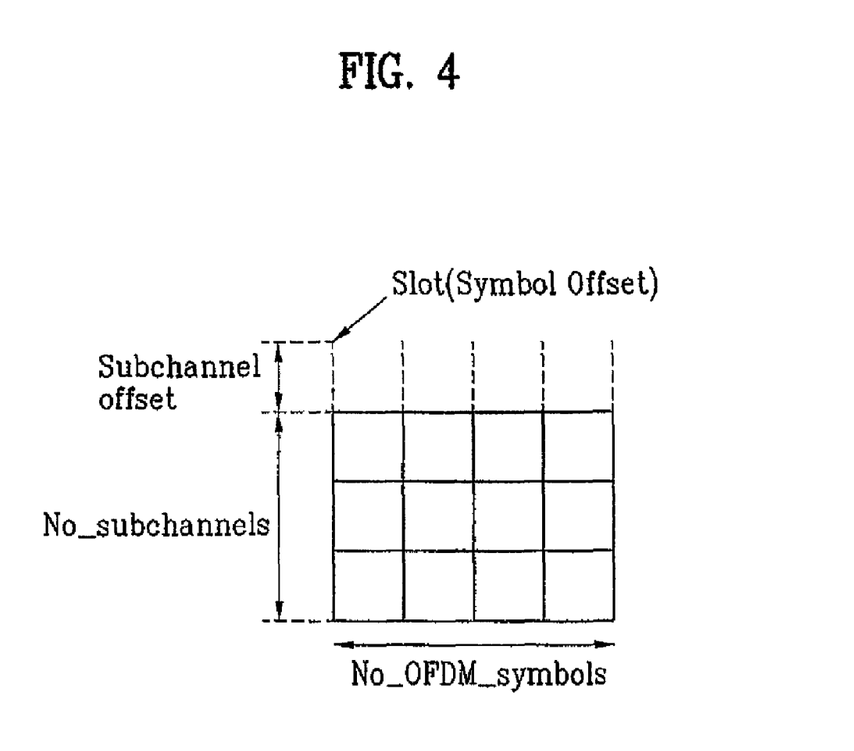
FIG. 4 is a diagram of an example of a data region for defining OFDMA resource allocation.

FIG. 4 is a diagram of an example of a data region for defining OFDMA resource allocation. Referring to FIG. 4, a slot allocated to each mobile terminal is defined by a data region of a 2-dimensional space, which is a set of continuous subchannels assigned by a burst. Namely, one data region in OFDMA, as shown in FIG. 4, can be represented as a rectangle determined by a time coordinate and a subchannel coordinate.

The data region can be allocated to an uplink transmission of a specific mobile terminal. And, in downlink, data can be transmitted to a mobile terminal via specific data region. In order to define the data region on 2-dimension, the number of OFDM symbols in a time domain and the number of continuous subchannels starting from a position distant from a reference point by an offset in a frequency domain should be allocated.

Figure 5:
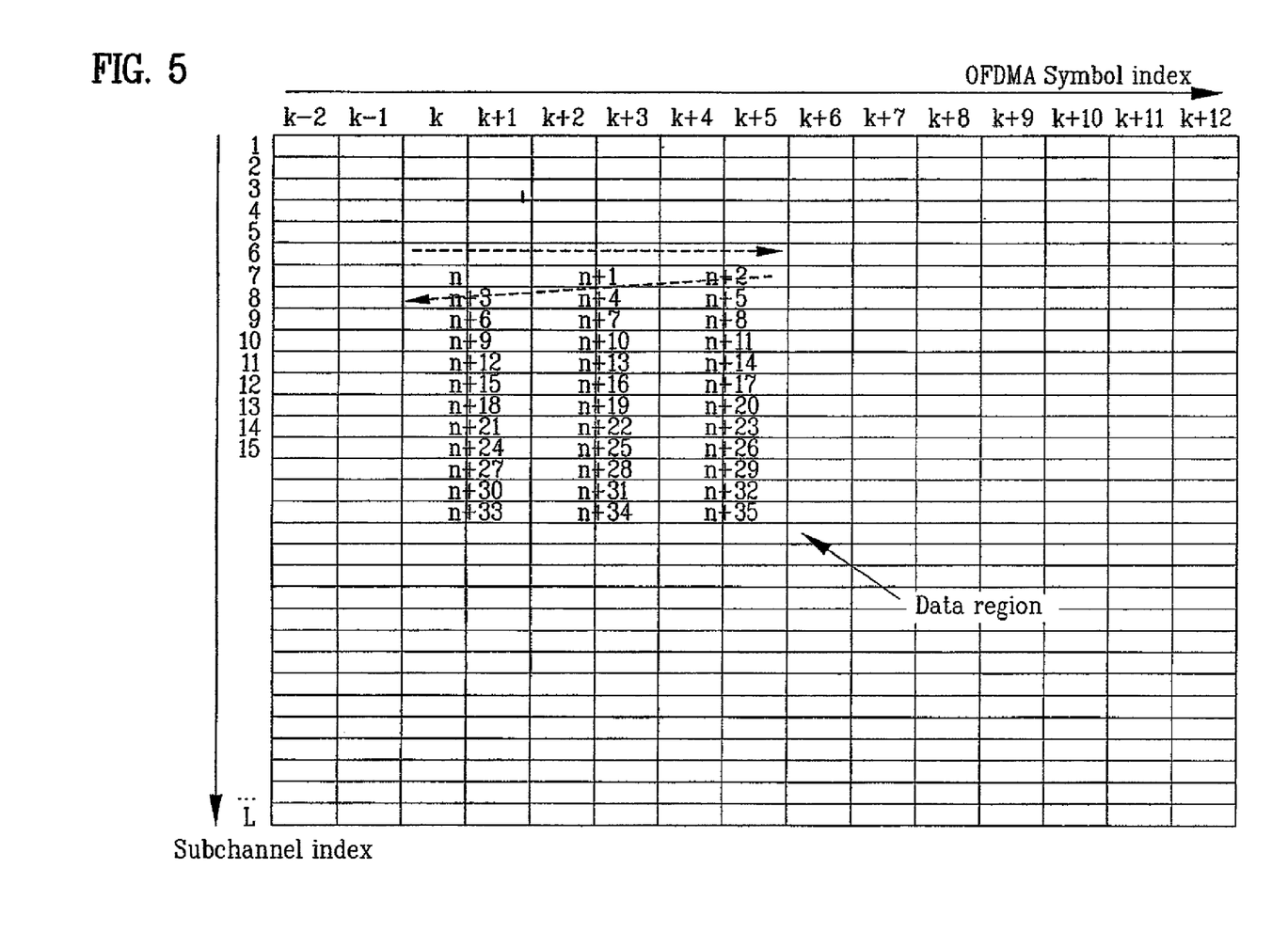
FIG. 5 is a diagram of a mapping method between subchannel/OFDM symbol of FEC.

FIG. 5 is a diagram of a mapping method between subchannel/OFDM symbol of FEC. MAC data is segmented according to a size of forward error correction (hereinafter abbreviated 'FEC') block. And, each FEC block is extended to occupy three OFDM symbols on a time axis of each subchannel. If an end of a data region is reached by performing mapping on each FEC block continuously in a manner of incrementing a subchannel number, the mapping keeps being performed from an OFDM symbol having a subsequent lower number in the same manner.

Figure 6:
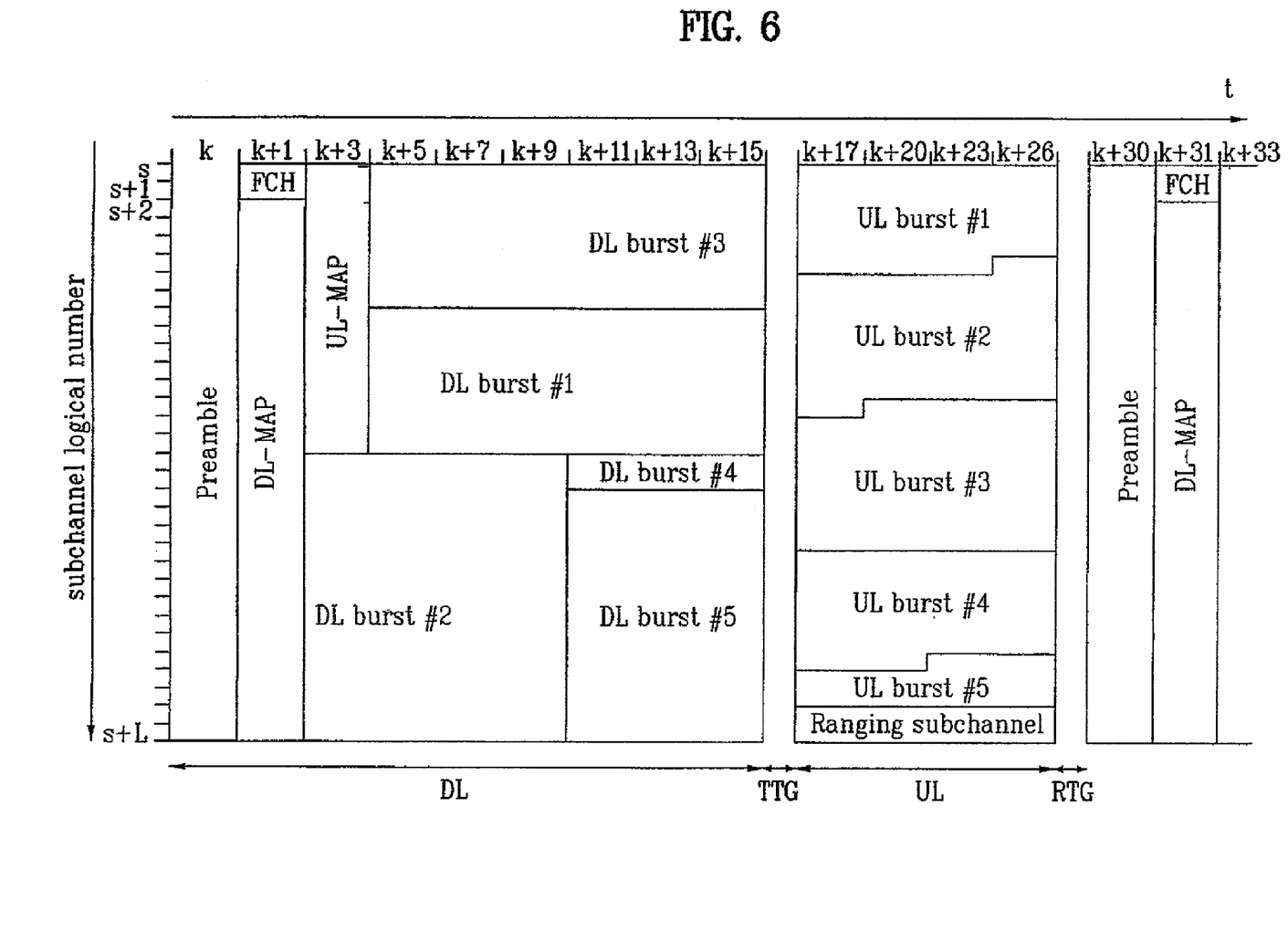
FIG. 6 is a structural diagram of an OFDM physical is layer frame of time division duplexing (hereinafter abbreviated 'TDD')

FIG. 6 is a structural diagram of an OFDM physical layer frame of time division duplexing (hereinafter abbreviated 'TDD'). Referring to FIG. 6, a downlink subframe starts from a preamble used for synchronization and equalization in a physical layer. A downlink MAP (DL-MAP) message and an uplink MAP (UL-MAP) message in a broadcast format defining positions and usages of bursts allocated to an uplink and a downlink, respectively follow the preamble in sequence to define an overall structure of a frame.

Table 1 shows an example of a downlink MAP (DL-MAP) message.

TABLE 1

| Syntax | Size | Notes |
|---|---|---|
| DL-MAP_Message_Format( ) { | | |
| Management Message Type = 2 | 8 bits | |
| PHY Synchronization Field | variable | See appropriate PHY specification |
| DCD Count | 8 bits | |
| Base Station ID | 48 bits | |
| Begin PHY Specific Section { | | See applicable PHY section. |
| for(i= 1; i <= n;i++) { | | For each DL-MAP element 1 to n. |
| DL-MAP_IE( ) | variable | See corresponding PHY specification. |
| } | | |
| if !(byte boundary) { | | |
| Padding Nibble | 4 bits | Padding to reach byte boundary. |
| } | | |
| } | | |
| if !(byte boundary) { | | |
| Padding Nibble | 4 bits | Padding to reach byte boundary. |
| } | | |
| } | | |

Table 2 shows an example of an uplink MAP (UL-MAP) message.

TABLE 2

| Syntax | Size | Notes |
|---|---|---|
| UL-MAP_Message_Format( ) { | | |
| Management Message Type = 3 | 8 bits | |
| Uplink Channel ID | 8 bits | |
| UCD Count | 8 bits | |
| Allocation Start Time | 32 bits | |
| Begin PHY Specific Section { | | See applicable PHY section. |
| for(i= 1; i <= n; i++) { | | For each UL-MAP element 1 to n. |
| UL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

A downlink MAP (DL-MAP) message defines a usage allocated per burst for a downlink region in a burst mode physical layer. Meanwhile, an uplink MAP (UL-AP) message defines a usage allocated per burst for an uplink region.

A usage of an information element configuring a UL-MAP message is decided by an uplink interval usage code (UIUC) per CID and a position of a corresponding region can be regulated by a 'duration' field. A per region usage is decided according to a UIUC value used by the UL-MAP. And, each region starts from a point distant from a previous IE start point by a duration regulated by UL-MAP IE.

Table 3 shows an example of DL-MAP IE.

TABLE 3

| Syntax | Size | Notes |
|---|---|---|
| DL-MAP_IE( ) { | | |
| DIUC | 4 bits | |
| if (DIUC == 15) { | | |
| Extended DIUC dependent IE | variable | |
| } else { | | |
| if (INC_CID == 1) { | | The DL-MAP starts with INC_CID = 0. INC_CID is toggled between 0 and 1 by the CID-SWITCH_IE( ) |
| N_CID | 8 bits | Number of CIDs assigned for this IE |
| for (n=0; n< N_CID; n++) { | | |
| CID | 16 bits | |
| } | | |
| } | | |
| OFDMA Symbol offset | 8 bits | |
| Subchannel offset | 6 bits | |
| Boosting | 3 bits | 000: normal (not boosted) |
| | | 001: +6 dB |
| | | 010: −6 dB |
| | | 011: +9 dB |
| | | 100: +3 dB |
| | | 101: −3 dB |
| | | 110: −9 dB |
| | | 111: −12 dB |
| No. OFDMA Symbols | 7 bits | |
| No. Subchannels | 6 bits | |
| Repetition Coding Indication | 2 bits | 0b00 - No repetition coding |
| | | 0b01 - Repetition coding of 2 used |
| | | 0b10 - Repetition coding of 4 used |
| | | 0b11 - Repetition coding of 6 used |
| } | | |
| } | | |

As shown in the example of Table 3, an information element (hereinafter abbreviated 'IE') configuring a downlink MAP (DL-MAP) discriminates a downlink traffic region corresponding to each mobile terminal through such position information of burst as a downlink interval usage code (DIUC), a connection ID, a subchannel offset, a symbol offset, a number of subchannels and a number of symbols.

Table 4 shows an example of UL-MAP IE.

TABLE 4

| Syntax | Size | Notes |
|---|---|---|
| UL-MAP_IE( ) { | | |
| CID | 16 bits | |
| UIUC | 4 bits | |
| if(UIUC==12){ | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00 - Initial Ranging/Handover Ranging over two symbols |
| | | 0b01 - Initial Ranging/Handover Ranging over four symbols |

TABLE 4-continued

| Syntax | Size | Notes |
|---|---|---|
|  |  | 0b10 - BW request/Periodic Ranging over one symbol |
|  |  | 0b11 - BW request/Periodic Ranging over three symbols |
| } else if (UIUC == 14) { |  |  |
| CDMA_Allocation_IE( ) | 32 bits |  |
| Else if (UIUC==15){ |  |  |
| Extended UIUC dependent IE | variable |  |
| }else{ |  |  |
| Duration | 10 bits | In OFDMA slots |
| Repetition coding indication | 2 bits |  |
| } |  |  |
| Padding nibble, if needed | 4 bits | Completing to nearest byte, shall be set to 0. |
| } |  |  |
| } |  |  |

An uplink region defined by UIUC 12 is allocated for a usage for an initial ranging, handover ranging, periodic ranging or bandwidth request and is allocated on the basis of contention.

In an OFDMA system applied to a broadband wireless access system, a mobile terminal performs a ranging request and an uplink bandwidth request for adjusting an uplink transmission parameter using CDMS code. Namely, a base station broadcasts to transmit a CDMA code set for the ranging and uplink bandwidth requests to mobile terminals via an uplink channel descriptor (UCD). And, the mobile terminal randomly selects a ranging code suitable for a usage from the received CDMA code set and then transmits it in an uplink region allocated for a ranging.

Table 5 shows an example of UCD message.

TABLE 5

| Syntax | Size | Notes |
|---|---|---|
| UCD_Message_Format( ){ |  |  |
| Management Message Type = 0 | 8 bits |  |
| Configuration Change Count | 8 bits |  |
| Ranging Backoff Start | 8 bits |  |
| Ranging Backoff End | 8 bits |  |
| Request Backoff Start | 8 bits |  |
| Request Backoff End | 8 bits |  |
| TLV Encoded information for the overall channel | Variable | TLV specific |
| Begin PHY Specific Section{ |  |  |
| for(i=0; i<=n; i++){ |  | For each uplink burst profile 1 to n |
| Uplink_Burst_Profile | Variable | PHY specific |
| } |  |  |
| } |  |  |
| } |  |  |

Table 6 shows examples of ranging and bandwidth request associated TLV parameters included in UCD message.

TABLE 6

| Name | Type (1 byte) | Length | Value |
|---|---|---|---|
| Initial ranging codes | 150 | 1 | Number of initial ranging CDMA codes. Possible values are 0-255.a |
| Periodic ranging codes | 151 | 1 | Number of periodic ranging CDMA codes. Possible values are 0-255.a |
| Handover ranging codes | | 1 | Number of handover ranging CDMA codes. Possible values are 0-255.a |
| Bandwidth request codes | 152 | 1 | Number of bandwidth request codes. Possible values are 0-255.a |
| Periodic ranging backoff start | 153 | 1 | Initial backoff window size for periodic ranging contention, expressed as a power of 2. Range: 0-15 (the highest order bits shall be unused and set to 0). |
| Periodic ranging backoff end | 154 | 1 | Final backoff window size for periodic ranging contention, expressed as a power of 2. Range: 0-15 (the highest order bits shall be unused and set to 0). |
| Start of ranging codes group | 155 | 1 | Indicates the starting number, S, of the group of codes used for this uplink. All the ranging codes used on this uplink will be between S and ((S + N + M + L + O) mod 256). Where, N is the number of initial-ranging codes. M is the number of periodic-ranging codes. L is the number of bandwidth-request codes. O is the number of initial-ranging codes. M is the number of handover-ranging codes. The range of values is 0 S ≦≦ 255 |

A downlink channel descriptor (DCD) message and an uplink channel descriptor (UCD) message are MAC management messages including uplink and downlink channels parameters of a base station, respectively. The base station periodically transmits the downlink channel descriptor (DCD) message and the uplink channel descriptor (UCD) message to mobile terminals within an area.

Each of the terminals obtains information for coding and modulation schemes corresponding to the respective bursts via the DCD/UCD message and then codes/decodes data using the obtained information. The mobile terminal decides whether a channel parameter of the base station is changed and then updates the channel parameter. Meanwhile, the UCD message includes the CDMZ code set associated with the ranging and bandwidth requests and information for a backoff time applied to a code collision after the code transmission.

The base station allocates ranging regions to the mobile terminals on the basis of contention via an uplink map information element. In this case, according to a usage of ranging, the ranging regions can be allocated by being divided into an initial ranging and handover ranging region and a periodic ranging and bandwidth request region. In the following description, the initial ranging and handover ranging region and the periodic ranging and bandwidth request region are abbreviated 'ranging and bandwidth request region'.

The base station having received the ranging code sets to deliver a transmission power adjustment value, a time and frequency adjustment value, a ranging status (success, fail) and the like necessary for uplink synchronization of the mobile terminal via a ranging response (RNG-RSP) message.

Table 7 shows an example of a ranging response message.

TABLE 7

| Syntax | Size | Notes |
|---|---|---|
| RNG-RSP_Message_Format( ){ | | |
|   Management Message Type = 5 | 8 bits | |
|   Uplink Channel ID | 8 bits | |
|   TLV Encoded Information | variable | TLV specific |
| } | | |

Table 8 shows an example of TLV parameter included in a ranging message.

TABLE 8

| Name | Type (1 byte) | Length | Value (variable-length) |
|---|---|---|---|
| Timing Adjust | 1 | 4 | Tx timing offset adjustment (signed 32-bit). The time required to advance SS transmission so frames arrive at the expected time instance at the BS. Units are PHY specific (see 10.3) |
| Power Level Adjust | 2 | 1 | Tx Power offset adjustment (signed 8-bit, o.25Db units) specifies the relative change in transmission power level that the SS is to make in order that transmission arrive at the BS at the desired power. When subchannelization is employed, the subscriber shall interpret the power offset adjustment as a required change to the transmitted power density. |
| Offset Frequency Adjust | 3 | 4 | Tx frequency offset adjustment (signed 32-bit, Hz units) specifies the relative change in transmission frequency that the SS is to make in order to better match the BS. (This is fine-frequency adjustment within a channel, not reassignment to a different channel.) |
| Ranging Status | 4 | 1 | Used to indicate whether uplink messages are received within acceptable limits by BS. 1 = continue, 2 = abort, 3 = success, 4 = rerange |
| Ranging code attributes | 150 | 4 | Bits 31 to 22: Used to indicate the OFDM time symbol reference that was used to transmit the ranging code Bits 21 to 16: Used to indicate the OFDMA subchannel symbol reference that was used to transmit the ranging code Bits 15 to 8: Used to indicate the ranging code index that was sent by the SS Bits 7 to 0: The 8 least significant bits of the frame number of the OFDMA frame where the SS sent the ranging code |

In case that the base station allocates an uplink bandwidth, in order for the mobile terminal to perform the ranging or bandwidth request, UIUC is set to 12 and a ranging method suitable for each usage is set up. And, an uplink MAP message including such an uplink MPA IE as the example shown in Table 4.

The initial ranging and handover ranging region and the bandwidth request and periodic ranging region can be allocated each frame on the basis of contention. In this case, an uplink MAP IE for the ranging or bandwidth request region allocation per frame should be included in the uplink MAP message. Yet, if the ranging and bandwidth request region is not frequently changed, ranging and bandwidth request region allocation information is included in an uplink channel descriptor message periodically transmitted by the base station instead of including the uplink MAP IE for the ranging and bandwidth request region allocation in the uplink MAP message each frame. In this case, by reducing a size of the uplink MAP message, the base station can prevent the waste of radio resources and the mobile terminal can reduce power for decoding the uplink MAP message.

Table 9 shows an example of downlink prefix (DL Frame Prefix).

TABLE 9

| Syntax | Size | Notes |
|---|---|---|
| DL_Frame_Prefix_Format( ) { | | |
|   Used subchannel bitmap | 6 bits | Bit #0: Subchannels 0-11 are used Bit #1: Subchannels 12-19 are used Bit #2: Subchannels 20-31 are used Bit #3: Subchannels 32-39 are used Bit #4: Subchannels 40-51 are used Bit #5: Subchannels 52-59 are used |
|   Ranging_Change_Indication | 1 bit | |
|   Repetition_Coding_Indication | 2 bits | 00: No repetition coding on DL-MAP 01: Repetition coding of 2 used on DL-MAP 02: Repetition coding of 4 used on DL-MAP 11: Repetition coding of 6 used on DL-MAP |
|   Coding_Indication | 3 bits | 0b000: CC encoding used on DL-MAP 0b001: BTC encoding used on DL-MAP 0b010: CTC encoding used on DL-MAP 0b011: ZT CC used on DL-MAP 0b100 to 0b111: Reserved |
|   DL-MAP_Length | 8 bits | |
|   reserved | 4 bits | Shall be set to zero |
| } | | |

A downlink prefix is placed ahead of a DL-MAP message ('FCH' in FIG. 6) and includes information associated with a current frame.

In the downlink prefix shown in Table 9, 'Ranging Change Indication' parameter is a flag that indicates whether an uplink ranging and bandwidth request region of a current frame is changed by being compared to that of a previous frame. For instance, if it is changed, the 'Ranging Change Indication' parameter is set to '1'. If not, the 'Ranging Change Indication' parameter can be set to '0'. In this case, in a frame having 'Ranging Change Indication' field set to '0'. It can be indicated that a ranging and bandwidth request region of an uplink is identical to that of a previous frame. And, an uplink MPA information element associated with allocation information of the ranging and bandwidth request region can be omitted.

A MAP information element associated with an allocation of a ranging and bandwidth request region can be omitted from an uplink MAP message or included therein each frame. Namely, a base station compares a current frame to a previous frame. If a ranging and bandwidth request region of the current frame is not changed, a ranging region change indication field of the downlink frame prefix shown in Table 9 is set to represent that the ranging region of the current frame is not changed from that of the previous frame. And, the MAP information element associated with the ranging and bandwidth request region can be omitted.

However, in this case, in order for a mobile terminal, which firstly make a registration to a network or performs a handover, to perform an initial ranging or to make a bandwidth request, the mobile terminal should wait until receiving an uplink MAP including a MAP information element associated with a ranging and bandwidth request region allocation from a base station. Moreover, in case that a base station has to transmit an uplink MAP message by including a MAP information element associated with a ranging and bandwidth request region allocation in the message each frame, the base station wastes its resources and power is consumed for a mobile terminal to decode the MAP information element associated with the ranging and bandwidth request region allocation each time.

DISCLOSURE OF THE INVENTION

Accordingly, the present invention is directed to obviate one or more of the problems due to limitations and disadvantages of the related art. An object of the present invention is to transmit allocation information of a ranging region transmitted each frame more efficiently.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a broadband wireless access system, in which a mobile terminal receives uplink region allocation information, a method of receiving the uplink region allocation information according to the present invention includes the steps of receiving an uplink map message from which an uplink map information element (UL-MAP IE) for a ranging region or an uplink bandwidth request region is omitted from a base station and receiving information for a region for a ranging region or uplink bandwidth request using a message periodically transmitted for a control information transmission for an uplink channel.

To further achieve these and other advantages and in accordance with the purpose of the present invention, in a broadband wireless access system, in which a base station transmits uplink region allocation information, a method of transmitting the uplink region allocation information includes the steps of obtaining information indicating whether a mobile terminal unable to obtain ranging region allocation information via a UCD message exists within an area of the base station, if the mobile terminal does not exist, transmitting an uplink map message from which an uplink map information element (UL-MAP IE) for a ranging region or an uplink bandwidth request region is omitted, and if at least one of the mobile terminal exists, transmitting the uplink map message including the uplink map information element for the ranging region or the uplink bandwidth request region.

Preferably, the message periodically transmitted for the control information transmission for the uplink channel is an uplink channel descriptor (UCD) message. More preferably, the ranging region is selected from the group consisting of an initial ranging region, a handover ranging region and a periodic ranging region.

More preferably, the uplink channel descriptor message includes information for an access to a wireless network, information for connection maintenance with the wireless network and information for an uplink data transmission.

Accordingly, by transmitting uplink region allocation information via a periodically transmitted message, the present invention can efficiently transmit the uplink region allocation information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

In the present specification, a mobile terminal includes a mobile subscriber station (MSS) capable of performing handover with at least one base station and a subscriber station (SS) capable of radio communications at one access point (AP) or within a base station.

Table 10 shows an example of a ranging and bandwidth request region allocation information parameter included in an uplink channel descriptor message in an OFDMA system. In the following description, a ranging and bandwidth request region means an initial ranging/handover ranging region and a bandwidth request/periodic ranging region.

TABLE 10

| Name | Type (1 byte) | Length | Value |
|---|---|---|---|
| Initial Ranging Region Allocation | mm | 4 | Bit #7 to #0: OFDMA Symbol offset<br>Bit #14 to #8: Subchannel offset<br>Bit #21 to #15: No. OFDMA Symbols<br>Bit #28 to #22: No. Subchannels<br>Bit #29: Ranging Method<br>(0: Initial Ranging/Handover Ranging over two symbols<br>1: Initial Ranging/Handover Ranging over four symbols<br>Bit #30 to #31: reserved |
| BW Request/Periodic Ranging Region Allocation | nn | 4 | Bit #7 to #0: OFDMA Symbol offset<br>Bit #14 to #8: Subchannel offset<br>Bit #21 to #15: No. OFDMA Symbols<br>Bit #28 to #22: No. Subchannels<br>Bit #29: Ranging Method<br>(0: BW Request/Periodic Ranging over one symbol<br>1: BW Request/Periodic Ranging over three symbols<br>Bit #30 to #31: reserved |

Table 11 shows an example of ranging and region allocation information parameter included in an uplink channel descriptor (UCD) message in an OFDM system.

TABLE 11

| Name | Type (1 byte) | Length | Value |
|---|---|---|---|
| Initial Ranging Region Allocation | mm | 4 | Bit 0 to 0: Start Time<br>Bit 15 to 11: Subchannel Index<br>Bit 25 to 16: Duration<br>Bit 27 and 26: Midamble repetition interval<br>Bit 31 to 28: reserved |
| BW Request Region Allocation | nn | 6 | Bit 0 to 0: Start Time<br>Bit 15 to 11: Subchannel Index<br>Bit 25 to 16: Duration<br>Bit 27 and 26: Midamble repetition interval<br>Bit 31 to 28: Frame Number Index<br>Bit 34 to 32: Transmit Opportunity Index |

TABLE 11-continued

| Name | Type (1 byte) | Length | Value |
|---|---|---|---|
| | | | Bit 40 to 35: Contention Channel Index<br>Bit 43 to 41: Contention Code Index<br>Bit 47 to 44: reserved |

Table 12 shows an example of downlink frame prefix.

TABLE 12

| Syntax | Size | Notes |
|---|---|---|
| DL_Frame_Prefix_Format( ) {<br>Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| Ranging_Change_Indication | 1 bit | |
| Repetition_Coding_Indication | 2 bits | 00: No repetition coding on DL-MAP<br>01: Repetition coding of 2 used on DL-MAP<br>02: Repetition coding of 4 used on DL-MAP<br>11: Repetition coding of 6 used on DL-MAP |
| Coding_Indication | 3 bits | 0b000: CC encoding used on DL-MAP<br>0b001: BTC encoding used on DL-MAP<br>0b010: CTC encoding used on DL-MAP<br>0b011: ZT CC used on DL-MAP<br>0b100 to 0b111: Reserved |
| DL-MAP_Length | 8 bits | |
| Existence of UL_MAP IE for Initial Ranging and BW REQ/Periodic Ranging | 2 bits | Bit #0: Existence of Initial Ranging UL-MAP IE<br>Bit #1: Existence of BW REQ/Periodic Ranging UL-MAP IE |
| Reserved<br>} | 2 bits | Shall be set to zero |

Table 13 shows an example of a downlink frame prefix.

TABLE 13

| Syntax | Size | Notes |
|---|---|---|
| DL_Frame_Prefix_Format( ) { | | |
| Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| Ranging_Change_Indication | 1 bit | |
| Repetition_Coding_Indication | 2 bits | 00: No repetition coding on DL-MAP<br>01: Repetition coding of 2 used on DL-MAP<br>02: Repetition coding of 4 used on DL-MAP<br>11: Repetition coding of 6 used on DL-MAP |
| Coding_Indication | 3 bits | 0b000: CC encoding used on DL-MAP<br>0b001: BTC encoding used on DL-MAP<br>0b010: CTC encoding used on DL-MAP<br>0b011: ZT CC used on DL-MAP<br>0b100 to 0b111: Reserved |
| DL-MAP_Length | 8 bits | |
| Ranging_Region_Allocation_Indication | 2 bits | Bit #0: Initial Ranging region is allocated.<br>Bit #1: BW REQ/Periodic Ranging region is allocated. |
| Reserved | 2 bits | Shall be set to zero |
| } | | |

Table 14 shows an example of a downlink frame prefix.

TABLE 14

| Syntax | Size | Notes |
|---|---|---|
| DL_Frame_Prefix_Format( ) { | | |
| Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| Ranging_Change_Indication | 1 bit | |
| Repetition_Coding_Indication | 2 bits | 00: No repetition coding on DL-MAP<br>01: Repetition coding of 2 used on DL-MAP<br>02: Repetition coding of 4 used on DL-MAP<br>11: Repetition coding of 6 used on DL-MAP |
| Coding_Indication | 3 bits | 0b000: CC encoding used on DL-MAP<br>0b001: BTC encoding used on DL-MAP<br>0b010: CTC encoding used on DL-MAP<br>0b011: ZT CC used on DL-MAP<br>0b100 to 0b111: Reserved |
| DL-MAP_Length | 8 bits | |
| Ranging_Region_Allocation_Indication | 2 bits | Bit #0: Initial Ranging region is allocated.<br>Bit #1: BW REQ/Periodic Ranging region is allocated. |

TABLE 14-continued

| Syntax | Size | Notes |
|---|---|---|
| Existence of UL_MAP IE for Initial Ranging and BW REQ/Periodic Ranging | 2 bits | Bit #0: Existence of Initial Ranging UL-MAP IE<br>Bit #1: Existence of BW REQ/Periodic Ranging UL-MAP IE |
| } | | |

In the downlink frame prefixes of Table 12 and Table 14, 'Existence of UL_MAP IE for Initial Ranging and BW REQ/Periodic Ranging' field is represented as a bitmap format. 'Bit #0' indicates whether initial ranging/handover ranging region allocation associated UL-MAP IE is included in UL-MAP message. 'Bit #1' indicates whether BW REQ/Periodic Ranging region allocation associated UL-MAP IE is included in UL-MAP message.

In the downlink frame prefixes of Table 13 and Table 14, 'Ranging_Region_Allocation_Indication' field is represented as a bitmap format. 'Bit #0' indicates whether an initial ranging/handover ranging region is substantially allocated to an uplink frame. 'Bit #1' indicates whether a BW REQ/Periodic Ranging region is substantially allocated to an uplink frame.

Table 15 represents Table 10 and Table 11 as one parameter.

TABLE 15

| Name | Type (1 byte) | Length | Value |
|---|---|---|---|
| Ranging Region | mm | 4 (one region)/8 (two regions) | Bit #0 to #7: OFDMA Symbol offset<br>Bit #8 to #14: Subchannel offset<br>Bit #15 to #21: No. OFDMA Symbols<br>Bit #22 to #28: No. Subchannels<br>Bit #29 and #30: Ranging Method<br>(0b00: Initial Ranging/Handover Ranging over two symbols<br>0b01: Initial Ranging/Handover Ranging over four symbols<br>0b10: BW Request/Periodic Ranging over one symbol<br>0b11: BW REQ/Periodic Ranging over three symbols)<br>Bit #31: reserved<br>(If length is 8 bytes, first 4 bytes indicate first ranging region and the following 4 bytes indicate another ranging region.) |

As shown in Table 15, bandwidth request/periodic ranging region allocation information can be represented as one UCD message parameter as well as uplink region allocation information.

Table 16 shows an example of a downlink frame prefix.

TABLE 16

| Syntax | Size (bits) | Notes |
|---|---|---|
| DL_Frame_Prefix_Format( ) { | | |
| Used subchannel bitmap | 6 | Bit #0: Subchannel group 0<br>Bit #1: Subchannel group 1<br>Bit #2: Subchannel group 2<br>Bit #3: Subchannel group 3<br>Bit #4: Subchannel group 4<br>Bit #5: Subchannel group 5 |
| Ranging_Change_Indication | 1 | |
| Repetition_Coding_Indication | 2 | 0b00: No repetition coding on DL-MAP<br>0b01: Repetition coding of 2 used on DL-MAP<br>0b10: Repetition coding of 4 used on DL-MAP<br>0b11: Repetition coding of 6 used on DL-MAP |
| Coding_Indication | 3 | 0b000: CC encoding used on DL-MAP<br>0b001: BTC encoding used on DL-MAP<br>0b010: CTC encoding used on DL-MAP<br>0b011: ZT CC used on DL-MAP<br>0b100: LDPC encoding used on DL-MAP<br>0b101 to 0b111: Reserved |
| DL-MAP_Length | 8 | |
| Ranging_Region_Allocation_Indication | 2 | Bit #0: When set to 1, Initial Ranging region is allocated as defined by UCD message.<br>Bit #1: When set to 1, BW REQ/Periodic Ranging regions is allocated as defined by UCD message. |
| reserved<br>} | 2 | Shall be set to zero |

'Ranging_Region_Allocation_Indication' field represented as a bit format in the downlink frame prefix shown in Table 16 is explained as follows. First of all, Bit #0 indicates whether an initial ranging/handover ranging region in a corresponding frame is allocated to an uplink frame as defined by UCD message. And, Bit #1 indicates whether a bandwidth request/periodic ranging region in a corresponding frame is allocated to an uplink frame as defined by UCD message.

For instance, if a value of Bit #0 is '0' and if a UL-MAP message doses not include UL_MAP IE for an initial ranging, it means that a base station does not allocate the initial ranging region.

And, if a value of Bit #0 is '1' and if a UL-MAP message doses not include UL_MAP IE for an initial ranging, a base station allocates the initial ranging region using UCD message parameter information of Table 11. In this case, a mobile terminal is able to perform an initial ranging with reference to the UCD message parameter shown in Table 11.

A base station can omit UP-MAP IE associated with ranging and bandwidth request region allocation transmitted each frame in a manner of transmitting UCD message including the ranging and bandwidth request region allocation information shown in Table 10, Table 11 or Table 15.

If a ranging and bandwidth request region allocated via UCD message needs to be changed, a base station transmits an uplink MAP message including UL-MAP IE associated with ranging and bandwidth request region allocation. Alternatively, by transmitting UCD message including changed ranging and bandwidth request region allocation information, a base station enables a mobile terminal to update allocation information of a ranging and bandwidth request region.

Meanwhile, even if a mobile terminal fails in receiving UL-MAP IE associated with ranging and bandwidth request region allocation from a base station, the mobile terminal is able to make a ranging request and a bandwidth request according to allocation information of a ranging and bandwidth request region included in a periodically received UCD message.

In case that ranging and bandwidth request allocation region of UL-MAP IE included in a UL-MAP message is different from ranging and bandwidth request allocation information obtained via UCD message, a mobile terminal can perform a ranging and bandwidth request via a region allocated according to UL-MAP IE included in UL-MAP message.

Moreover, in order to enable mobile terminals, which fail in obtaining ranging and bandwidth request region allocation information via UCD message in the related art, to perform a ranging and bandwidth request, a base station can transmit UL-MAP message to the mobile terminals by including UL-MAP IE containing ranging and bandwidth request region allocation information in the UL-MAP message as well as transmits region allocation information of the ranging and bandwidth request via the UCD message. In this case, the ranging and bandwidth request region allocation information of the UL-MAP IE can be rendered identical to the allocation information of the ranging and bandwidth request region of the UCD message.

Moreover, a base station transmits information indicating whether the base station has allocated a ranging and bandwidth request region as defined by a parameter contained in UCD message to mobile terminals via a downlink prefix. By receiving the prefix, each of the mobile terminals can perform a ranging and bandwidth request even if UL-MAP IE indicating ranging and bandwidth request region allocation information is omitted from UL-MAP message.

Moreover, in order to enable mobile terminals, which fail in obtaining ranging and bandwidth request region allocation information, to perform a ranging and bandwidth request using UCD message according to the present invention, a base station can transmit UL-MAP message to the mobile terminals by including UL-MAP IE containing allocation information of a ranging and bandwidth request region in the UL-MAP message.

Hence, only if the entire mobile terminals within an area are able to obtain the allocation information of the ranging and bandwidth request region using the UCD message, the allocation information of the ranging and bandwidth request region can be transmitted using the UCD message shown in Table 19, Table 11 or Table 15.

Table 17 shows an example of a parameter included in a basic capability request message (SBC-REQ) and a basic capability response message.

TABLE 17

| Type | Length | Value | Scope |
|---|---|---|---|
| 167 | 1 | Bit #0: Ranging Region Allocation by UCD support<br>Bit #1 to #7: reserved | SBC-REQ, SBC-RSP |

In network registration, a base station and a mobile terminal can negotiate whether mobile terminals using the above parameters can acquire allocation information of a ranging and bandwidth request region using UCD message.

Figure 7:
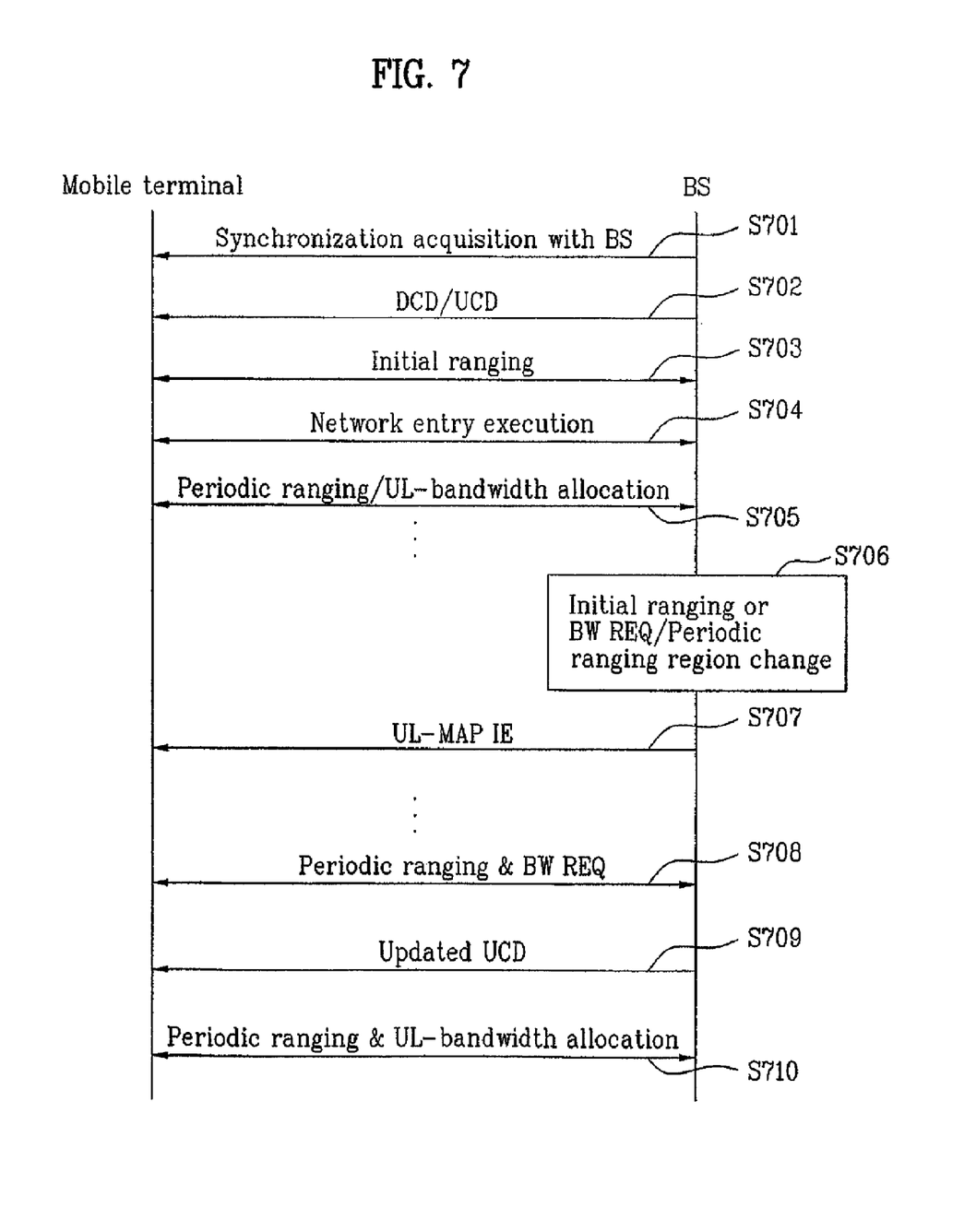
FIG. 7 is a flowchart of a method of transmitting uplink region allocation information via UCD message according to one embodiment of the present invention.

FIG. 7 is a flowchart of a method of transmitting uplink region allocation information via UCD message according to one embodiment of the present invention.

Referring to FIG. 7, a mobile terminal acquires downlink synchronization with a base station (S701) and obtains uplink and downlink channel parameters by receiving a downlink channel descriptor (DCD) and an uplink channel descriptor (UCD) message transmitted in a broadcast format from the base station. In this case, the UCD message includes ranging and bandwidth request region allocation information shown in Table 10 or Table 15.

The mobile terminal transmits a ranging request for an initial ranging in an initial ranging region according to initial ranging region allocation information obtained from the UCD message. In this case, in an OFDMA system, an initial ranging code is transmitted through an uplink initial ranging region. Meanwhile, in OFDM and single carrier system, a ranging request message is transmitted in the initial ranging region.

Having received the ranging request from the mobile terminal, the base station transmits a ranging response message including an uplink transmission parameter adjustment value and a ranging status (success or continue) to the mobile terminal (S703). After completion of the ranging procedure, the mobile terminal performed a procedure for network registration (S704).

By performing a ranging periodically to adjust an uplink transmission parameter for uplink communications with the base station, the mobile terminal should maintain uplink transmission synchronization continuously. In the OFDMA system, despite not receiving UL-MAP IE associated with periodic ranging region allocation information, the mobile terminal transmits a periodic ranging code to the base station via an uplink region obtained through a periodic ranging region allocation information parameter of the UCD message if a periodic ranging execution time comes. An example of the periodic ranging region allocation information of the UCD message is shown in Table 10 or Table 15.

Having received the periodic ranging code, the base station transmits the uplink transmission parameter adjustment value to the mobile terminal via a ranging response message. The terminal then performs a periodic ranging procedure with the base station using the received transmission parameter adjustment value. Meanwhile, in case that the mobile terminal makes a request for a bandwidth for uplink data transmission to the base station, the mobile terminal transmits a bandwidth request code to the base station via the bandwidth request region obtained through the bandwidth request region allocation information parameter of the UCD message. An example of a bandwidth request allocation information parameter of the UCD message is shown in Table 10, Table 11 or Table 15. Having received the bandwidth request code, the base station allocates an uplink bandwidth (S705).

In case that the base station changes a ranging and bandwidth request region (S706), the base station needs to transmit the changed region allocation information parameter to the mobile terminal. In this case, the base station can transmit the changed region allocation information to the mobile terminal via UCD message. And example of region allocation information of the UCD message is shown in Table 10, Table 11 or Table 15. Yet, since the UCD message is not a message that is transmitted each frame but a periodically transmitted message, the base station is unable to immediately transmit the changed region allocation information to the mobile terminals right after the change. In this case, the base station can transmit the changed region and bandwidth request region allocation information to the mobile terminals via UL-MAP IE included in an uplink message (S707). In this case, until the changed region allocation information is transmitted to the mobile terminals, the base station can transmit the region allocation information to the mobile terminals using the UL-MAP IE.

The mobile terminal decides whether the UL-MAP IE including the ranging and bandwidth request region allocation information is transmitted in a corresponding frame via a downlink frame prefix. An example of the downlink frame prefix is shown in Table 12, Table 13, Table 14 or Table 16. And, the mobile terminal decides whether the region is allocated to the corresponding frame as defined in the parameter of the UCD message.

As a result of the decision, if an uplink region for a ranging or bandwidth request is allocated as not defined in the UCD message parameter and if a ranging and bandwidth request needs to be made, the mobile terminal performs the bandwidth request or ranging in the uplink region according to the UL-MAP IE (S708).

The base station periodically transmits UCD message to the mobile terminals (S709). The UCD message is transmitted in a broadcast format and can include a ranging and bandwidth region allocation information parameter. An example of region allocation information included in the UCD message is shown in Table 10, Table 11 or Table 15. The mobile terminal performs a ranging and bandwidth request procedure using the region allocation information included in the UCD message (S710). Even if the ranging and bandwidth request region allocation information is not changed, the base station transmits an uplink MAP message including UL-MAP IE associated with a ranging or bandwidth allocation information to the mobile terminals by a predetermined frame interval. So, the mobile terminals unable to obtain the ranging and bandwidth request region allocation information via the UCD message can make the ranging and bandwidth request.

Figure 8:
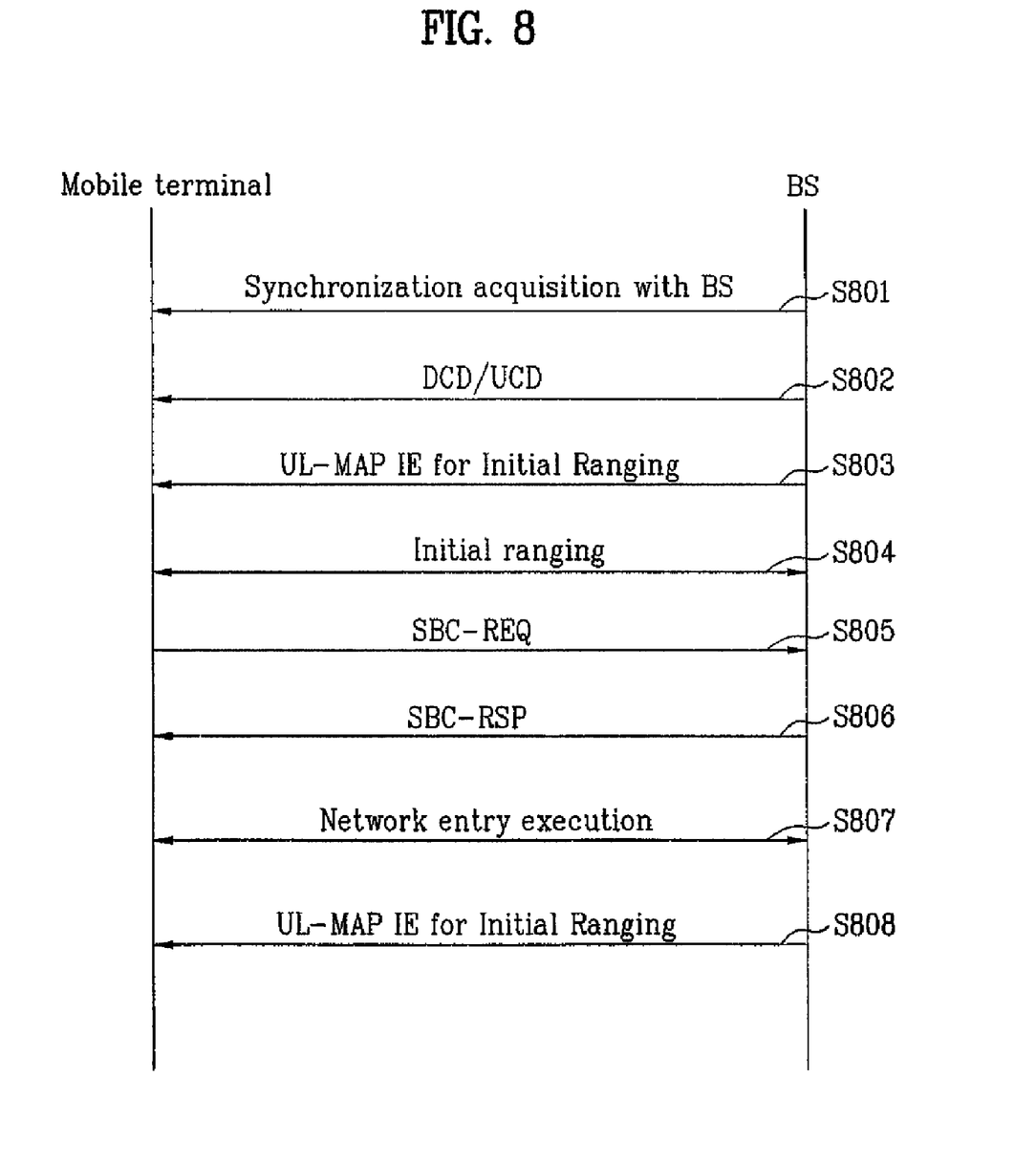
FIG. 8 is a flowchart of a process for transmitting uplink region allocation information according to one embodiment of the present invention.

FIG. 8 is a flowchart of a process for transmitting uplink region allocation information according to one embodiment of the present invention.

Referring to FIG. 8, a mobile terminal acquires downlink synchronization with a base station (S801) and obtains uplink and downlink channel parameters by receiving a downlink channel descriptor (DCD) and an uplink channel descriptor (UCD) message transmitted in a broadcast format from the base station (S802).

By transmitting UL-MAP IE including initial ranging allocation information to mobile terminals via an uplink MAP message by a predetermined interval, the base station delivers information for an initial ranging region to the mobile terminals (S803). The mobile terminal performs a following initial ranging procedure using the initial ranging region allocated through the UL-MAP IE (S804). First of all, the mobile terminal transmits a ranging request for an initial ranging to the base station. In this case, in an OFDMA system, an initial ranging code is transmitted through an uplink initial ranging region. Meanwhile, in OFDM and single carrier system, a ranging request message is transmitted in the initial ranging region. Having received the ranging request from the mobile terminal, the base station transmits a ranging response message including an uplink transmission parameter adjustment value and information of a ranging status (success or continue) to the mobile terminal.

As mentioned in the foregoing description, the base station can transmit ranging region allocation information to the mobile terminal via UCD message. In this case, an uplink MPA message can be transmitted by omitting UL-MAP IE including the ranging region allocation information. Yet, if so, there may exist a mobile terminal unable to obtain the ranging region allocation information via the UCD message.

In such a case, the mobile terminal transmits a parameter indicating that a ranging region allocation support via the UCD message is impossible to the base station via a basic capability request message (SBC-REQ) (S805). An example of this parameter is shown in Table 17. Meanwhile, the base station can transmit the parameter shown in Table 17 via a basic capability response message (SBC-RSP) of the mobile terminal corresponding to the basic capability request message (SBC-REQ) (S806). Meanwhile, the base station can know whether the mobile terminal supports the ranging region allocation via the UCD message through a MAC version included in the ranging request message of the mobile terminal as well as through the basic capability request message.

The mobile terminal performs a rest network entry procedure (S807). In this case, the rest network entry procedure means to perform the steps S24 to S29 in FIG. 2.

As mentioned in the foregoing description, in case that there exists a mobile terminal unable to receive the region allocation information via the UCD message, the region allocation information is transmitted to the mobile terminal via UL-MAP IE included in an uplink map (S808). The region allocation information is transmitted via UL-MAP IE included in an uplink map corresponding to a substantially allocated frame.

For the mobile terminal unable to receive the region allocation information via the UCD message, the region allocation information is transmitted via the UCD message as well as via the UL-MAP IE. In this case, information indicating that the region allocation information is going to be transmitted via the UCD message through a downlink frame prefix. An example of parameter included in the UCD message is shown in Table 10, Table 11 or Table 15. And, an example of parameter included in the downlink frame prefix is shown in Table 12, Table 13, Table 14 or Table 16.

If the mobile terminal unable to receive the region allocation information via the UCD message releases a network registration or moves away into another base station area so that the entire mobile terminals within the corresponding base station area can receive the region allocation information via the UCD message, the base station transmits information indicating that DL-MAP IE for a region allocation is omitted from a downlink MAP message via a downlink frame prefix. Meanwhile, the information for the region allocation is transmitted using the parameter included in the UCD message.

INDUSTRIAL APPLICABILITY

Accordingly, the present invention is applicable to a wireless communication system, and more particularly, to a broadband wireless access system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of receiving and transmitting information for an uplink in a mobile communication system, the method comprising:

acquiring, at a mobile terminal, a downlink synchronization with a base station;

receiving, by the mobile terminal, an uplink channel descriptor (UCD), including first ranging region information related to a first allocation region for at least a ranging request or an uplink bandwidth request, from the base station;

receiving, by the mobile terminal, an uplink map information element, including second ranging region information related to a second allocation region for at least the ranging request or the uplink bandwidth request, from the base station; and transmitting, by the mobile terminal, codes related to at least the ranging request or the uplink bandwidth request to the base station, using the second ranging region information since the second ranging region information has priority over the first ranging region information, wherein the first ranging region information includes first fields of an orthogonal frequency division multiple access (OFDMA) symbol offset, a sub-channel offset, a number of OFDMA symbols, a number of sub-channels and a ranging method, and the second ranging region information includes second fields of an OFDMA symbol offset, a sub-channel offset, a number of OFDMA symbols, a number of sub-channels and a ranging method.

2. The method of claim 1, wherein the uplink channel descriptor further includes a code set for at least the ranging request or the uplink bandwidth request.

3. The method of claim 2, wherein the code set includes a plurality of code division multiple access (CDMA) codes.

4. The method of claim 1, wherein the OFDMA symbol offset field has 8 bits, and the sub-channel offset field has 7 bits, and the number of OFDMA symbols field has 7 bits, and the number of sub-channels field has 7 bits and the ranging method field has 2 bits.

5. The method of claim 1, wherein the first allocation region and the second allocation region are used for at least an initial ranging region, a handover ranging region, a periodic ranging region, or a bandwidth request.

6. The method of claim 1, wherein the first ranging region information and the second ranging region information are allocated by the base station.

7. The method of claim 1, wherein the first ranging region information and the second ranging region information are allocated by contention based manner.

8. A method of receiving and transmitting information for an uplink in a mobile communication system, comprising:

acquiring, at a base station, a downlink synchronization with a mobile station;

transmitting, by the base station, an uplink channel descriptor (UCD), including a first ranging region information related to a first allocation region for at least a ranging request or an uplink bandwidth request, to the mobile station;

transmitting, by the base station, an uplink map information element, including a second ranging region information related to a second allocation region for at least the ranging request or the uplink bandwidth request, to the mobile station; and receiving, by the base station, a code related to at least the ranging request or the uplink bandwidth request from the mobile station, using the second ranging region information since the second ranging region information has priority over the first ranging region information, wherein the first ranging region information includes first fields of an OFDMA symbol offset, a sub-channel offset, a number of OFDMA symbols, a number of sub-channels and a ranging method, and the second ranging region information includes second fields of an OFDMA symbol offset, a sub-channel offset, a number of OFDMA symbols, a number of sub-channels and a ranging method.

9. The method of claim 8, wherein the uplink channel descriptor further includes a code set for at least the ranging request or the uplink bandwidth request.

10. The method of claim 9, wherein the code set includes a plurality of CDMA codes.

11. The method of claim 8, wherein the OFDMA symbol offset field has 8 bits, and the sub-channel offset field has 7 bits, and the number of OFDMA symbols field has 7 bits, and the number of sub-channels field has 7 bits and the ranging method field has 2 bits.

12. The method of claim 8, wherein the first allocation region and the second allocation region are used for at least an initial ranging region, a handover ranging region, a periodic ranging region, or a bandwidth request.

13. The method of claim 8, wherein the first ranging region information and the second ranging region information are allocated by the base station.

14. The method of claim 8, wherein the first ranging region information and the second ranging region information are allocated by contention based manner.

* * * * *